United States Patent
Westerman et al.

(10) Patent No.: US 6,736,309 B1
(45) Date of Patent: May 18, 2004

(54) QUICK ERECTING FOLDABLE PORTABLE COOLER

(75) Inventors: Frank E. Westerman, Little Rock, AR (US); Frank G. Westerman, Maumelle, AR (US)

(73) Assignee: Wes-Pak, Inc., Little Rock, AR (US)

(*) Notice: Subject to any disclaimer, the term of this patent is extended or adjusted under 35 U.S.C. 154(b) by 0 days.

(21) Appl. No.: 10/295,171

(22) Filed: Nov. 15, 2002

Related U.S. Application Data
(60) Provisional application No. 60/333,208, filed on Nov. 16, 2001.

(51) Int. Cl.[7] ............................... B65D 5/24; B65D 5/36; B65D 5/475
(52) U.S. Cl. ............................ 229/117.05; 229/117.19; 229/117.24; 229/148; 229/149; 229/186
(58) Field of Search ...................... 229/117.05, 117.06, 229/117.19, 117.24, 148, 149, 186; 62/457.1, 457.5, 457.7

(56) References Cited

U.S. PATENT DOCUMENTS

| | | | |
|---|---|---|---|
| 2,008,443 A | * 7/1935 | Froehlig | 229/186 |
| 2,147,503 A | * 2/1939 | Seifer | 229/117.24 |
| 3,131,849 A | 5/1964 | Paige | |
| 3,140,813 A | * 7/1964 | Hall et al. | 229/148 |
| 3,193,176 A | * 7/1965 | Gullickson | 229/117.06 |
| 3,246,829 A | 4/1966 | Sexton | |
| 3,254,827 A | * 6/1966 | Chapman | 229/148 |
| 3,465,948 A | 9/1969 | Boyer | |
| 4,119,265 A | 10/1978 | Diugopolski | |
| 4,171,763 A | * 10/1979 | Card | 229/148 |
| 4,174,051 A | * 11/1979 | Edwards et al. | 229/117.19 |
| 4,176,423 A | * 12/1979 | Wigemark | 229/117.19 |
| 4,328,923 A | 5/1982 | Graser | |
| 4,465,227 A | * 8/1984 | Hood et al. | 229/186 |
| 4,687,130 A | * 8/1987 | Beeler | 229/149 |
| 5,018,663 A | * 5/1991 | Corso | 229/148 |
| 5,020,337 A | 6/1991 | Krieg | |
| 5,050,766 A | 9/1991 | Groh | |
| 5,062,527 A | 11/1991 | Westerman | |
| 5,094,359 A | 3/1992 | DeMars | |
| 5,284,294 A | 2/1994 | Floyd | |
| 5,303,863 A | 4/1994 | Arasim | |
| 5,307,986 A | 5/1994 | Schuster | |
| 5,562,228 A | 10/1996 | Ericson | |
| 6,164,526 A | 12/2000 | Dalvey | |

FOREIGN PATENT DOCUMENTS

JP     5-38641 A    * 12/1993     229/117.24

\* cited by examiner

*Primary Examiner*—Gary E. Elkins
(74) *Attorney, Agent, or Firm*—Stephen D. Carver

(57) ABSTRACT

A quick erecting, disposable cooler which is transformable from a flat blank of corrugated sheet material may be non-destructively "knocked down" or collapsed after being semi-erected. The deployed cooler is moisture-proof and lacks leak paths, so it reliably stores and transports melting ice and beverage containers. A generally rectangular center panel is integrally bordered by pairs of end panels and side panels. Each side panel supports a foldable top panel with special knockouts and tabs to facilitate subsequent coupling of the panels. Each end panel has a small flap at its outer edge facilitating coupling. Four, integral, diametrically spaced-apart corner panels interconnect the center panel with the end and side panels. Score lines defined between the orthogonally arranged panels facilitate folding. Corner panels include diagonal score lines. The center panel forms a cooler bottom, and the end and side panels respectively form carton ends and sides when foldably deployed.

2 Claims, 8 Drawing Sheets

QUICK ERECTING FOLDABLE PORTABLE COOLER

CROSS REFERENCE TO RELATED APPLICATION

This utility application is based upon, and claims priority from, previously filed U.S. Provisional Patent application Serial No. 60/333,208, filed Nov. 16, 2001, and entitled Quick Erecting Foldable Portable Cooler

BACKGROUND OF THE INVENTION

I. Field of the Invention

The present invention relates generally to portable, foldable corrugated or cardboard containers. More particularly, our present invention relates to corrugated or paperboard boxes ideal for temporarily storing canned or bottled beverages upon a bed of ice. Prior art that is germane to the invention is located in U.S. Class 229, Subclasses 177–179.

II. Description of the Prior Art

Numerous portable, box-like containers have been proposed in the prior art for temporarily storing and thermally-isolating iced beverages. Typically, such containers comprising portable, disposable "coolers" are folded together from large blanks, sometimes being constrained by gluing or staples, or other, separate mechanical means added to the assembled blank after folding. Suitable blanks, as well recognized in the art, are usually made of paperboard, cardboard, or corrugated material. Typical prior art, disposable cartons or "coolers" known to us are variously sized to accommodate a good portion of a typical bag of ice combined with several twelve to sixteen ounce beverage bottles or cans.

Typical corrugated "coolers" are subject to moderate but not-insignificant stresses, resulting from their internal load, and the rough handling that they are subjected to during use. It is well recognized in the art that such containers will be treated poorly by their consumers, and they are inevitably subjected to substantial physical abuse, vibration, and pounding. Since they typically constrain a hefty quantity of ice cubes and a six-pack or two of a desired beverage, design considerations relating to weight, strength and endurance are commercially important. Further, the ice melts over time, so the container is subject to attack and weakening from water. Of course it is desirable that suitable coolers temporarily constrain the melt-off, so that leaking water does not escape the cooler and damage the users vehicle, possessions, clothing or the like. Of course the previously discussed misuse to which such containers are routinely subjected further aggravates the foregoing design considerations.

In addition to the foregoing considerations, the commercial success and/or market practicability of candidate corrugated coolers is inexorably linked to common market factors like the cost of production, the cost of shipment, and ease of use. Where as here the product is represented as being "disposable," a low cost is obviously a root consideration. Although the strongest available corrugated coolers are routinely assembled by the beverage vendor, rather than the retail beverage consumer, it is imperative for cost minimization that the candidate cooler be shippable in a flat, unassembled form. Further, a proper design must abrogate the typical requirement of mechanical staples or other accessory fastener means that are typically required by common prior art units. Finally, the assembled container must be durable and waterproof, at least for a significant portion of its intended or expected useful life, which can vary between three to five hours when subjected to conditions of hard use.

Recognizing some of these problems, Floyd in U.S. Pat. No. 5,284,294 discloses a disposable container made from an integral blank of corrugated cardboard that folds between flat, storage orientations and an erected or deployed configuration. The container is adapted to store beverages or other articles, in an appealing, iced down condition. A bottom wall is foldably attached to two pairs of side walls that are joined by pleated walls, forming a "seamless" interior when assembled. The latter feature is important for leak-proofing. The container walls are self-locking without external staples or fasteners. A moisture-proof coating formed on the box interior further minimizes potential leakage. One of the top walls has a panel with lateral locking tabs that fold down during cooler assembly and are mated to receptive slots formed by the upright walls. The carrying handle is formed from abutting cutouts.

Prior U.S. Pat. No. 5,062,527, which issued Nov. 5, 1991 and which was invented by one of the inventors common to this case, disclosed a "Foldable, leakproof multi-mode Carton Construction" and a blank that is similar to the instant invention. The slotless and leakproof cooler therein disclosed is commercially adapted for storing medical waste. The corrugated, cooler blank can be quickly folded to form the cooler. Preferably, a separate plastic liner is provided to waterproof the cardboard or corrugated material interiorly. Each blank comprises a center panel, a pair of bordering width panels, a pair of bordering length panels, and four corner panels. The scoring lines comprises a first pair of spaced apart, parallel fold lines extending longitudinally, and a second pair of parallel fold lines crossing the width of the blank. Diagonal fold lines are scored into the corner panels. The center panel forms a bottom of the cooler, and the width and length panels respectively form cooler ends and sides. The corner panels are foldably divided into separate segments which abut each other and are adjacent to the length panels. A knock down system that permits erected coolers to be flattened, includes a knock down line which evenly bisects the blank and a cooperating pair of groups of generally triangular relief lines formed in the center panel. The assembled cooler may be flattened by urging the length panels together, whereupon the width panels will fold into the carton interior. A similar deforming movement facilitated by the triangular relief lines enables the center panel to collapse outwardly from the carton.

DeMars, U.S. Pat. No. 5,094,359 discloses an ice cooler adapted to be disposed in a minimum volume disposition for shipping, which is thereafter expanded upon erection. Cooler end and side panels comprise foldable flaps that close the container. The foldable flaps are uncoupled to expose the container interior and facilitate and increase in resultant size to allow the introduction of beverage containers and a quantity of ice.

Krieg, U.S. Pat. No. 5,020,337, issued Jun. 4, 1991 and entitled "Combination ice package and Expandable Cooler" comprises a box-like cooler comprising an extendable upper portion consisting of folded cardboard flaps. Expanding top flaps fold to form a top seal through the use of mating notches which frictionally engage one another. The upper portion of the structure is provided with circular access areas through which drinks may be inserted while being consumed.

Ericson, U.S. Pat. No. 5,562,228 discloses a collapsible cooler comprising a floor surrounded by a plurality of foldable walls interconnected by a hinge. Internal container subassemblies include quantities of a heat transfer material. Peripheral hinges connect the floor module and the lower wall subassemblies for securing the lower wall subassemblies to the floor assembly. Flexible corner panels are connected between adjacent, foldable wall assemblies. A carry strap assembly which includes a first end is connected to one upper wall subassembly, and a second end of the carry strap assembly is connected to an opposite upper wall subassembly. A lid assembly with a handle is adapted to fit onto upper edges of the respective upper wall subassemblies.

Arasim, U.S. Pat. No. 5,303,863 issued Apr. 19, 1994, discloses a corrugated container having a compartment for multiple containers of beverage, and means for holding a coolant such as ice in a heat exchange relationship. The holding means comprise a plurality of panels arranged in stacked relationship when deployed and the panels can be unfolded to form an ice bin atop the compartment. Ice is poured into the bin and cans are cooled by direct contact with the ice. By first withdrawing plural cans from the compartment, pouring ice and then nestling the withdrawn cans back into the bin-contained ice, many or all cans are in direct cooling contact with the ice.

Dlugopolski, U.S. Pat. No. 4,119,265 issued Oct. 10, 1978 and entitled "Seamless leakproof container" discloses a cooler made from a single, generally rectangular corrugated blank. A pair of triangular corner panels first folded together into face-to-face contact are folded over the ends of a box as the four sides of the rectangular blank are raised to form the side and end panels of a five-sided box. A cover panel is integrally joined to one edge of a side panel, to swing down and close the box.

Schuster, U.S. Pat. No. 5,307,986, entitled "Expandable watertight article carrier" discloses a cooler comprising top and side panels interconnected by gusset panels. When the gusset panels are relaxed, the side and end panels are released to pivot about their foldable connection to the bottom panel to expand the interior of the carrier while maintaining the carrier in watertight condition.

U.S. Pat. No. 4,784,497 issued Nov. 15, 1988 to Dutton teaches a flat, paperboard blank which can be conveniently carried and readily assembled into a rectangular carton for disposal of small litter such as cups, cans, and tissues. Of somewhat less relevance are U.S. Pat. No. 4,801,006 issued to Martin on Jan. 31, 1989; and U.S. Pat. No. 4,724,955, issued on Feb. 16, 1988, also to Martin. Various bag-in-box combinations are applied in the prior art for other purposes as well. Such systems are taught by Green U.S. Pat. No. 4,660,737 issued Apr. 28, 1987; U.S. Pat. No. 4,572,422 issued Feb. 25, 1986 to Heuberger.; and, Sachs U.S. Pat. No. 3,122,297 issued Feb. 25, 1964 for storage of liquids such as milk.

Through experimentation with numerous devices of the type generally described above, we have invented a new disposable portable cooler that adequately addresses the goals outlined above.

SUMMARY OF THE INVENTION

Our new ice cooler quickly deploys from a flat "minimal volume" storage position in which numerous blanks may be stored atop one another in layers. Each blank can be quickly folded to form a cooler. The inherently "slot less" blank co-features a "knock-down" bottom, enabling quantities of partially-erected boxes to be shipped with minimal volume. After proper deployment, the resultant ice box has no proactive leak paths, so that it reliably but temporarily acts as an ice cooler, despite its humble composition and inexpensive character.

The preferably rectangular blank is ideally die-cut from corrugated sheet stock, that is preferably coated or lined with a thin polyethylene coating. It could also be formed from waterproofed paperboard, solid fiber plastic material, or various forms of commercial-grade cardboard. Each blank comprises a generally rectangular center panel integrally bordered by a pair of end panels and a pair of side panels. Each end panel has a small, outer, flap at its edge for folding. Four, integral, diametrically spaced apart corner panels interconnect the center panel with the end and side panels. Score lines proximatley defined between the orthogonally arranged panels facilitate subsequent folding. Preferably the corner panels include diagonal score lines. In the best mode a first pair of spaced apart, parallel fold lines extend longitudinally along the length of the blank, and a second pair of parallel fold lines traverse the width. The corner panels include diagonal score lines extending between a notched, outer vertice of each corner panel to a corner of the interior center panel. The center panel forms a cooler bottom, and the cooler end and side panels respectively form carton ends and sides when foldably deployed.

When the width and length panels are folded vertically upwardly, the corner panels will bend across the diagonal fold lines, being transformed into twin, generally triangular abutting segments that abut each other in surface-to-surface contact. These segments are foldably tucked away into the cooler interior after box erection, and they are retained by properly folding the end panel flaps downwardly into the cooler interior. The notched vertices of the corner panels transform into regularly shaped, conforming ends that are spaced from one another when folded. Thus, an erected cooler has no slots or inherent leak paths.

Each side panel preferably comprises an integral, companion top panel that borders a score or fold line. Each top panel has a central knock-out hole that aligns upon assembly to secure and anchor a suitable plastic, auxiliary handle. One of the top panels has an outer, folding flap with reduced dimensions. A small internal, tab-receptive slot is defined between this flap and the border of its top panel along a fold line that separates them.

The other top panel on the opposite side of the blank is specially configured along its bordering fold line with the other side panel, from which it projects. The border between them comprises an elongated, rectangular knock-out in the form of a void, into which a transverse tab extends. This tab projects from the side panel to the bordering top panel, across the gap of the knocked out void. This tab is scored at its projecting end to disassociate from and break away from the second top panel when suitably pressed or deflected by the user. The tab is bisected by appropriate scoring so it will fold away from the side panel to which it remains mechanically secured, and its body may fold into cooperating halves. The tab is mated to the tab-receptive slot associated with the opposite box side panel and its top panel.

Preferably a knock down system is included to enable erected coolers to be folded into a partially flat storage or shipping configuration at the behest of the user. The preferred knock down system includes a knock down line which evenly bisects the blank and divides the center panel and the two width panels in half. A cooperating pair of groups of generally triangular relief lines intersected by the knock down line are defined in the top and bottom of the center panel. The assembled carton may be "knocked down" by urging the side panels together while pushing gently downwardly upon the inner center panels. The corner panels will deform and fold, being foldably deflected into a flat disposition. A similar deforming movement facilitated by the triangular relief lines enables the center panel (which forms the floor of the carton) to deform and project outwardly from the carton, enabling the carton to assume a flat orientation. Thus, a large supply of our coolers can be stored with minimal space requirements.

The preferred handle is intentionally a separate part. The handle has a conventional profile, comprising a central body terminating in a pair of spaced-apart ends, each of which is equipped with integral feet that anchor beneath the receptive holes formed in one top panel. When the two top panels are folded atop one another, the top panel flap discussed earlier fits into the elongated knockout defined before, and the tab receptive slot may be penetrated by the folding tab projecting from the second side panel. This locking arrangement is urged into stable, semi-permanence by the application force or weight at the ends of the handle. In other words, as a load constrained between and within the folded panels (i.e., in the cooler) generates force, this same force tends to compressively urge the folded panels together, and the tab and its tab receptive slot "get stronger" in response to weight, and thus the weight borne by the cooler tends to more firmly lock the apparatus together.

On the other hand, "conventional" coolers that fold together as aforesaid tend to weaken in response to weight. That is because the handle formed by such designs is made form various box panel knock-outs or cutout's that cleverly align upon folding. But when a loading force is applied to such designs, the locking panels tend to separate, rather than come together. Further, with prior art designs using separate handle components, there is no synergistic interconnection for weight distribution and loading purposes as that described and illustrated herein. And, as a proximate result, weight distributed by the separate plastic handles of prior art designs does not tend to force interfitting panels together.

Thus a broad object of our invention is to provide a reliable folding cooler for containing ice and beverages.

A related basic object is to provide an inexpensive blank which easily folds into a such a cooler.

Another broad object of our invention is to provide a quick erecting, foldable and leakproof cooler and a corrugated blank that can be folded into a cooler.

Another important object of the present invention is to provide an improved disposable cooler made from a slotless, corrugated blank that may be readily transformed between a relatively flat storage configuration, and a secure, box-like cooler configuration that durably stores ice and beverages.

Another object is to provide such an improved, disposable cooler that is lightweight and strong, and yet which is resistant to water leaks.

A related object is to provide a disposable ice cooler of the character described that occupies a minimal shipping volume when transported from the manufacturer.

Another object of the present invention is to provide a slotless, foldable cooler blank characterized by enhanced leak resistance and quick folding erection.

A related object of the present invention is to provide a knock-down cooler that can be partially erected and thereafter non-destructively collapsed at the behest of the user.

A still further object is to provide a cooler of the character described which may be formed simply by folding a corrugated blank, but which may be easily flattened into a transportable or storage position.

Another fundamental object of our invention is to provide a durable but inexpensive cooler that will store ice and a plurality of bottles or cans without leakage or collapse for a relatively long period of time.

A further basic object is to provide a cooler of the character described that will function reliably even when abused.

Another important object is to provide a reliable beverage ice cooler that replaces conventional, environmentally-unfriendly styrofoam coolers.

Yet another object is to provide a rugged, foldable cooler which, when lifted up by its handle, strengthens rather than wakens.

An additional object of our invention is to provide a cooler of the character described which may be readily assembled from a single, integral, pre-scored blank.

Yet another object is to provide a foldable cooler which is effective for storing warm or cold products for moderate periods of time.

A similar object is to provide a box of the character described that can be shipped in a partially-erected configuration. It is a feature of our preferred corrugated blank that an internal "knock-down" adaptation enables the partially erected cooler to be quickly compressed into a minimal volume configuration.

Another important object is to a provide a cooler design of the character described, and a blank for such a cooler, which may be selectively deployed in flat and/or fully or partially set-up orientations, without extraneous and ancillary staples, fasteners, tape, or glue.

Yet another object is to provide a disposable cooler which is easily folded between flat storage positions and deployed, generally cubical configurations.

In other words, an important object of our new cooler is to minimize complexity and set-up difficulty.

Yet another object of our construction is to make an improved disposable cooler whose inherent locking features readily provide a strong and secure connection between foldable parts.

Another important object is to provide an inherently stable flap closing design that is re-useable.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
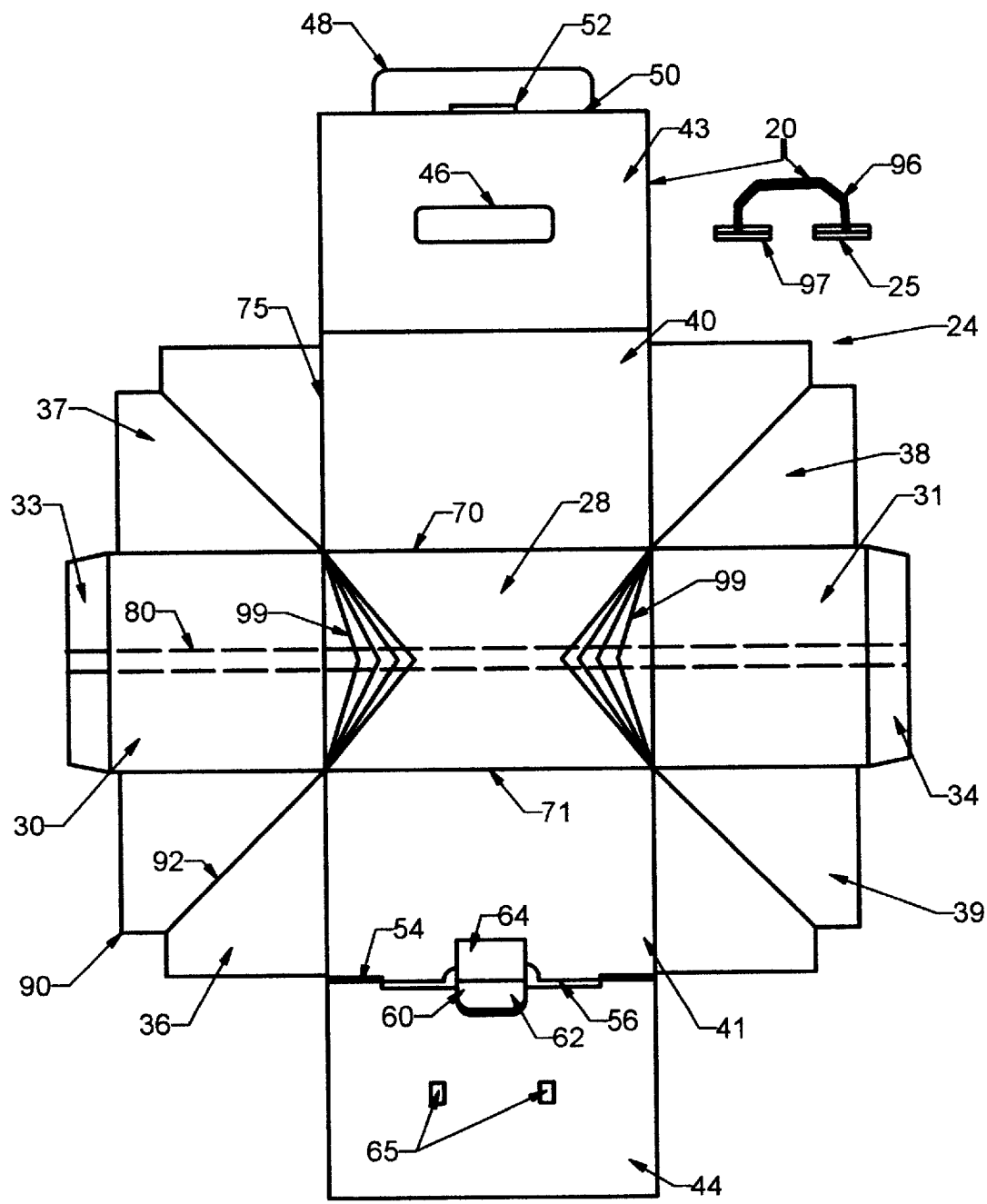
FIG. 1 is a partially-exploded plan view of a corrugated, pre-scored blank constructed as taught by our invention, that can be folded as hereinafter described to form our improved cooler, with the optional liner portion thereof omitted for brevity and the handle spaced apart for clarity.

With reference now directed to the appended drawings, our improved cooler has been generally designated by the reference numeral 20. While cooler 20 is designed to hold ice and a plurality of beverage cans or bottles, a variety of other items can be accommodated. Cooler 20 comprises a generally planar blank 24, which can be arranged and sized to fit a variety of different volumes and geometrical configurations, and a separate, plastic handle 25. Blank 24 is folded as hereinafter described, so as to transform itself into the cooler 20, that includes handle 25. When so folded, as along fold-line 80 (FIG. 1), blank 24 forms cooler 20 in such a manner that no leak paths or slots are formed. After erection the cooler may be flattened for storage or shipping as hereinafter described.

Figure 3:
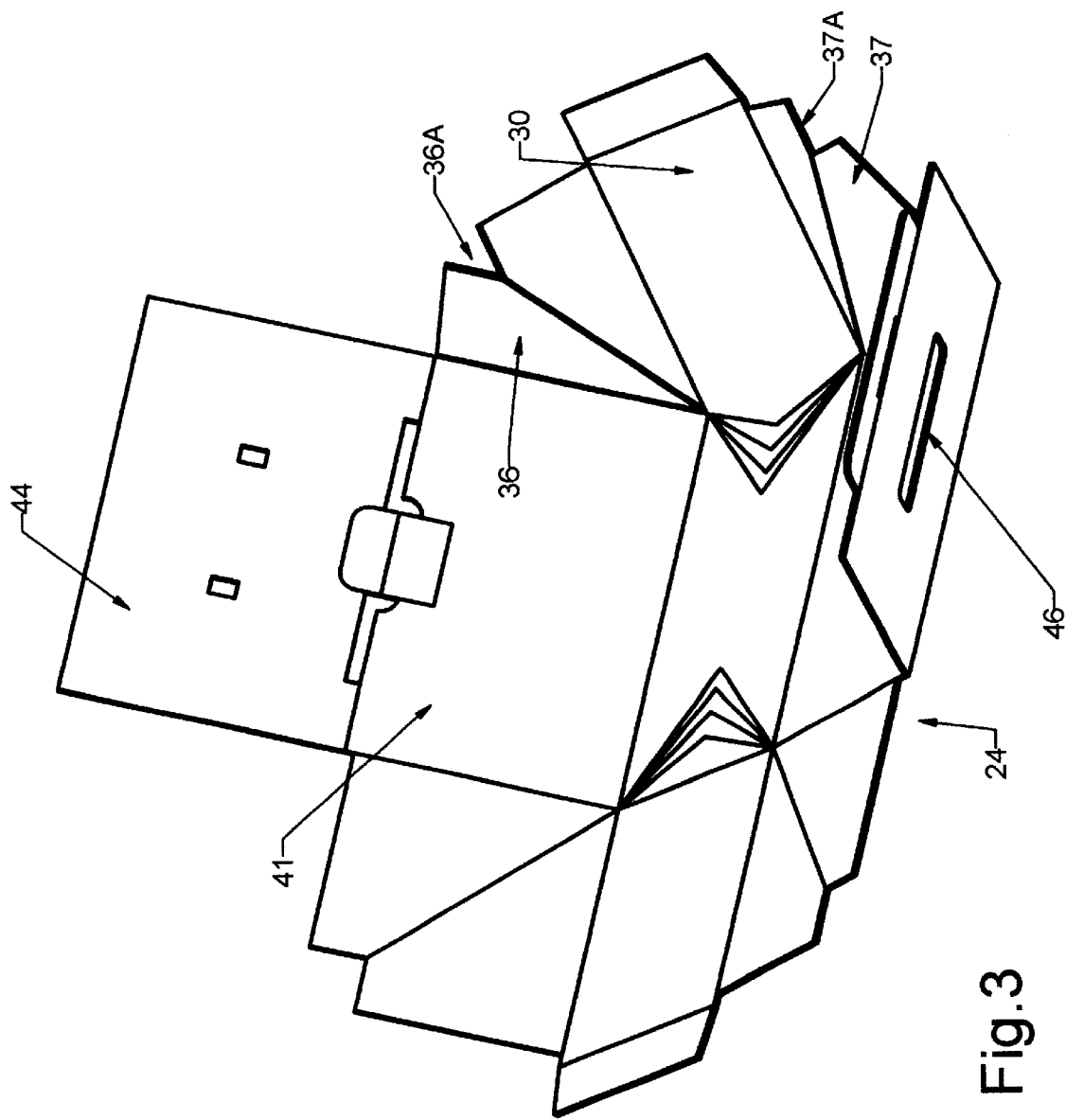
FIG. 3 is a perspective view showing partial folding of the blank of FIG. 2, with an end panel and its adjacent corner panels partially deflected, with portions thereof omitted for brevity or shown in section for clarity.
Figure 4:
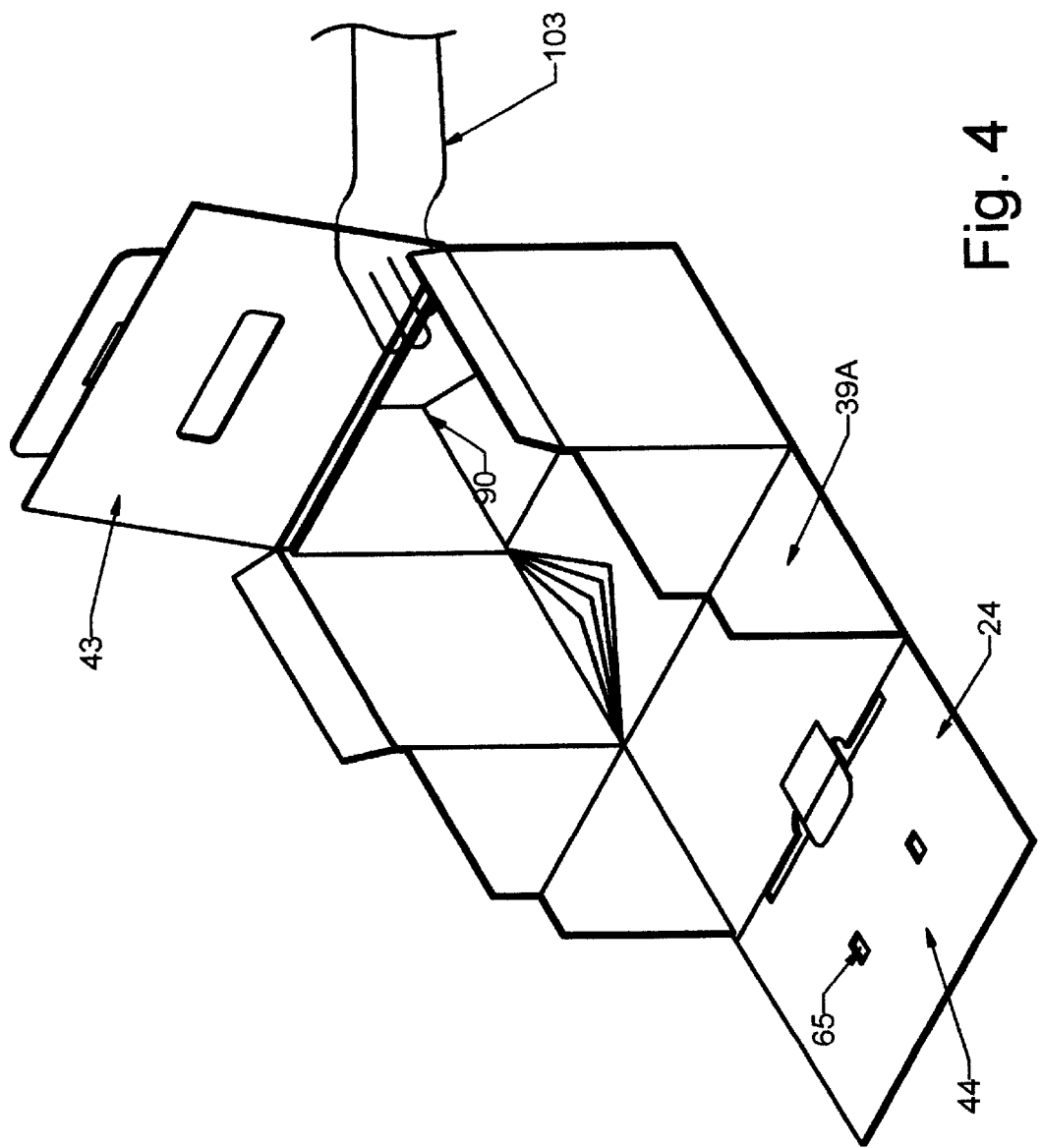
FIG. 4 is a perspective view similar to FIG. 3, showing partial folding of the blank of FIG. 2, but with an end panel and associated corner panels completely deflected, with portions thereof omitted for brevity or shown in section for clarity.

Preferably blank 24 is formed from a die-cut piece of corrugated sheet material. It can also be formed from paperboard, cardboard, or other fibrous sheet materials known in the art. FIGS. 2–4 show that what will be the inner surface of the cooler 20, once the blank is folded as described later, is preferably coated with a polyethylene plastic layer 21 (FIG. 2) to handle moisture. As appreciated from FIGS. 1, and 2, the blank 24 it is preferably somewhat rectangular, having a length (i.e., that runs from top to bottom in FIG. 1) somewhat greater than its width. The panel has been appropriately scored by a plurality of score lines to be later described which divide the blank into a plurality of separate but integral panels. When blank 24 is folded to form the cooler 20, the preferred steps involved are partially illustrated in sequential form in consecutive FIGS. 2–8. Each of the panels seen in FIGS. 1–2 will form the various body portions of the deployed cooler as illustrated in FIG. 8.

Figure 2:
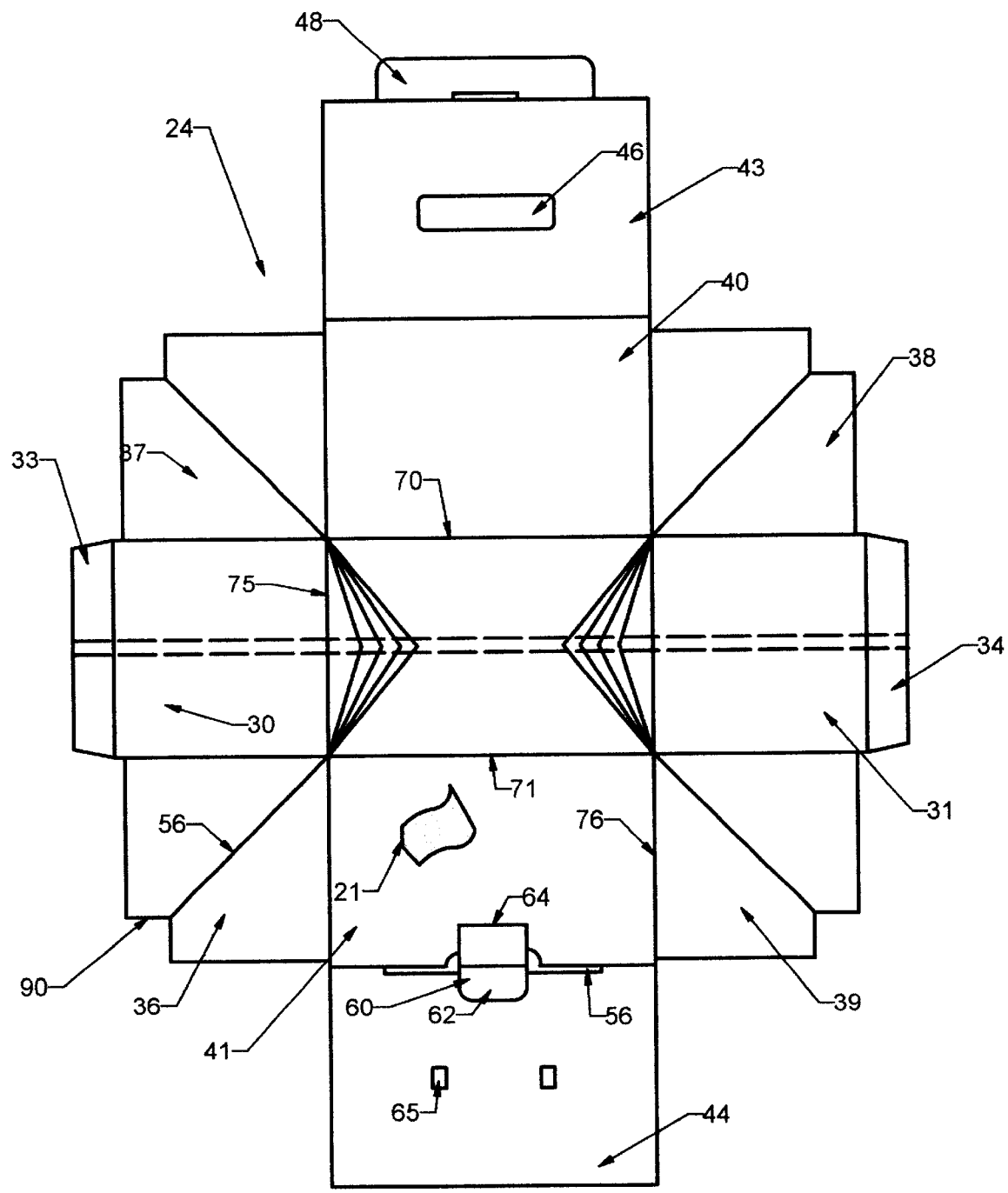
FIG. 2 is a top plan view similar to FIG. 1 showing a preferred plastic-coated blank constructed in accordance with the best mode of the invention.

For purposes of clarity, it should be appreciated that the upper or top surface projecting towards the viewer in FIGS. 1 and 2 becomes the interior surface of the cooler 20 after folding. Of course the various panels and portions of panels exposed in FIGS. 1 and 2 have a corresponding undersurface not seen until folding occurs. The undersurface of each numbered panel or part identified by a given reference numeral in FIGS. 1 and 2 will be designated in succeeding drawing Figures by the same reference numeral with the suffix "A" appended to it when that given part's undersurface becomes exposed to the viewer in FIGS. 3–8.

The preferably rectangular blank 24 is die-cut from corrugated sheet stock, and is preferably coated or lined with a thin polyethylene coating such as layer 21 (FIG. 2). The blank 24 can be produced through a variety of techniques known in the art, and it can be made from waterproof paperboard, fiber or plastic sheet materials, or different forms and types of commercial-grade cardboard or heavy weight paper.

The preferred blank 24 comprises a generally rectangular center panel 28. Panel 28 is integral with a pair of end panels 30, 31 which comprise small, outer, flaps 33, 34 respectively at their outermost extremities. These flaps 33, 34 fold inwardly during assembly, and end up in a horizontal orientation adjacent the cooler top (i.e., which is formed from the overlying top panels) and act as reinforcements. Blank 24 further comprises four, integral, corner panels 36, 37, 38 and 39, and integral side panels 40, 41. The diametrically spaced-apart corner panels 36–39 interconnect the center panel 28 with the end panels 30 and 31 and with the side panels 40, 41. Side panels 40, 41 preferably comprise integral, companion top panels 43, 44 respectively.

Top panel 43 has a central, rectangular knock-out hole 46 that provides clearance for the handle 25 upon assembly, and an outermost, locking flap 48 that is generally rectangular. This locking flap 48 is foldably coupled across a score line 50 to the integral, bordering, top panel 43. A small internal, tab-receptive slot 52 is defined along score line 50 between flap 48 and top panel 43 for interconnection with the opposite top panel as described later.

The opposite side panel 41 (i.e., at the bottom of FIGS. 1, 2) has an integral, companion top panel 44 that is cut differently than cooperating top panel 43. Top panel 44 is foldably separated from integral side panel 41 by score line 54. An elongated, rectangular knock-out formed in the blank 24 defines a generally T-shaped anchor slot 56. A two piece locking tab 60 projects perpendicularly into and across the anchor slot 56. Tab 60 projects from the side panel 41 into the integral, bordering top panel 44 across the gap or void of anchor slot 56 and into the body of top panel 44 (FIGS. 1, 2). This tab 60 comprises folding halves 62 and 64 to aid in locking. Upon assembly, as later described, the locking tab 60 mates within slot 52 in the opposite top panel 43, after these top panels are folded appropriately. Tab half 62 is scored deeply at its projecting end adjacent and within top panel 44 to disassociate from and break away from the top panel when suitably deflected by the user. Top panel 44 also comprises a pair of anchor holes 65 that receive the handle 25 and then anchor it, as described later.

Numerous fold lines proximately defined between the above discussed, orthogonally arranged panels are scored into the blank 24. These score lines facilitate subsequent folding. A pair of elongated, spaced apart fold lines 70, 71 running widthwise within the blank 24 separate the side panels 40, 41 and the corner panels 36–39 from the central panel 28 and end panels 30 and 31 (FIGS. 1, 2). A similar pair of elongated, spaced apart fold lines 75, 76 perpendicularly running lengthwise within the blank 24 separate the end panels 30, 31 and the corner panels from the central and side panels 28, 40, and 41 respectively. Interior elongated score 80 (FIG. 1) provides a widthwise-extending fold line that divides the blank 24 in half.

Each corner panel 36–39 is similarly sized and configured. Each is somewhat square, with an outer notch cut into its diametrically, outwardly extending vertice. For example corner panel 36 has a notch 90 cut into its outermost corner. Corner panel 36 (like the rest of them) has a diagonal score line 92 defined through its center, running from a vertice of central panel 28 to the notch 90.

The lightweight plastic handle 25 (FIGS. 1, 6) is best injection molded. It comprises an elongated plastic body 96 that terminates at its opposite ends in resilient, deformable feet 97. These feet may be deflected or pushed gently into somewhat horizontal alignment and abutment with the body of 96 of handle 25 so that the feet may be inserted through anchor holes 65 (FIGS. 1, 2) defined in the top panel 44. This will effectively lock the handle to the blank 24, since, when released, handle's feet 97 will assume their normal transverse orientation relative to handle body 96, and they will act as anchors. The anchoring feet 97 will not allow the handle to be pulled out of the panel anchor holes 65 as they cannot fit through these holes unless appropriately skewed.

The handle is preferably a separate part. The box panels are forcibly urged into stable, locking arrangement when the box is weighted, and supported by the lid. The top panels, which fit into one another, are frictionally urged into firm abutment when the handle is gripped, and the cooler 20 is lifted. Forces are distributed upon and around the top panels, which tend in response to more firmly grip one another. The forces applied by the handle compressively urge the folded panels together, and the tab-to-slot mated top panels "get stronger" in response to this weight. Therefore the weight borne by the cooler handle tends to more firmly lock the top panels together. Conventional folding coolers that use cut-outs (i.e., scored, aligned segments) weaken in response to heavy weights borne by their multi-piece handles. Loading forces applied to conventionally defined and arranged handles can tend to allow panel separation, instead of encouraging panel locking. This phenomena is an important synergistic result of our panel deign and construction outlined above.

Finally, the central panel 28 is preferably provided at each of its ends with a plurality of knock-down score line arrays, generally designated by the reference numeral 99. These generally V-shaped arrays 99 each comprise multiple, independent and angled score lines that enable the partially completed cooler 20 to be "knocked down" or non-destructively and temporarily "squashed" for transport or temporary storage. This structure and phenomena are outlined and explained in detail in prior U.S. Pat. No. 5,062,527, entitled "Foldable, leakproof multi-mode Carton Construction," which issued Nov. 5, 1991, and which is owned by the same assignee as in this case. The latter patent, including its text and drawings, are hereby incorporated by reference for purposes of disclosure.

Preferred Assembly

Those with skill in the art will immediately recognize that various assembly steps may be juxtapositioned during box erection. Although the order of folding may be varied, the preferred steps are sequentially illustrated by FIGS. 3–8.

Folding can commence as in FIGS. 3 and/or 4. In FIG. 3 or 4, the blank 24 has been grasped by the arms 103 (FIG. 4) of the assembler. The corner panels 36–39 are folded inwardly, as partially seen in FIG. 3, until their "notched ends" align as in FIG. 4 with each corner panels folded into abutting triangular halves, with the notches 90 reoriented by folding and positioned ultimately in spaced-apart, facing relation as in FIG. 4. In FIG. 3 side panel 41 and its top panel 44 are folded upwardly. The opposite side panel 40 is covered by the folded corner panels in FIG. 4, but the upwardly projecting top panel 43 is seen clearly.

Figure 5:
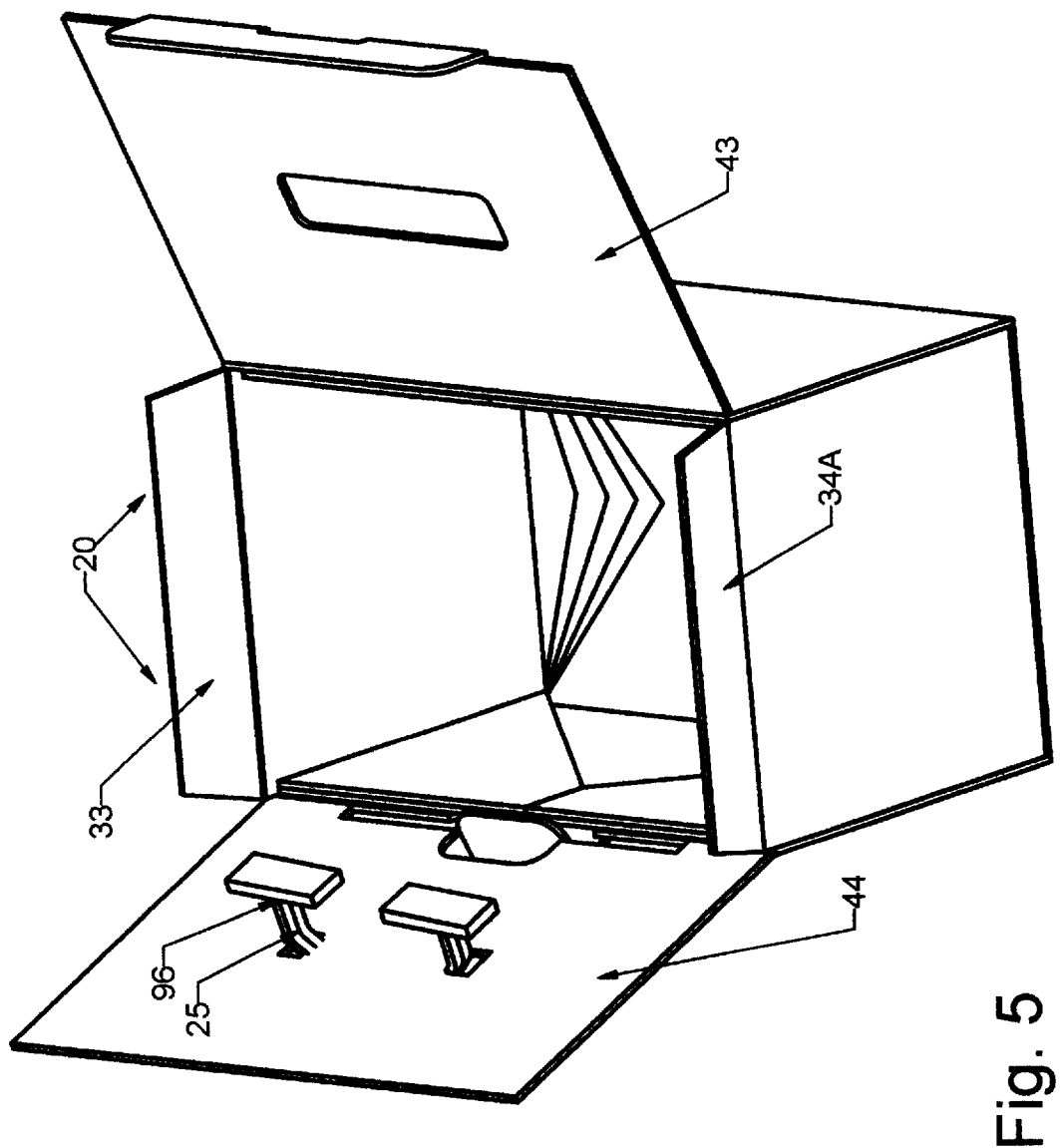
FIG. 5 is a perspective view similar to FIGS. 3 and 4, showing partial, semi-completed folding of the blank of FIG. 2, with both side panels and both end panels and their associated corner panels almost completely deflected, and with the top panels exposed for subsequent folding, with portions thereof omitted for brevity or shown in section for clarity.
Figure 6:
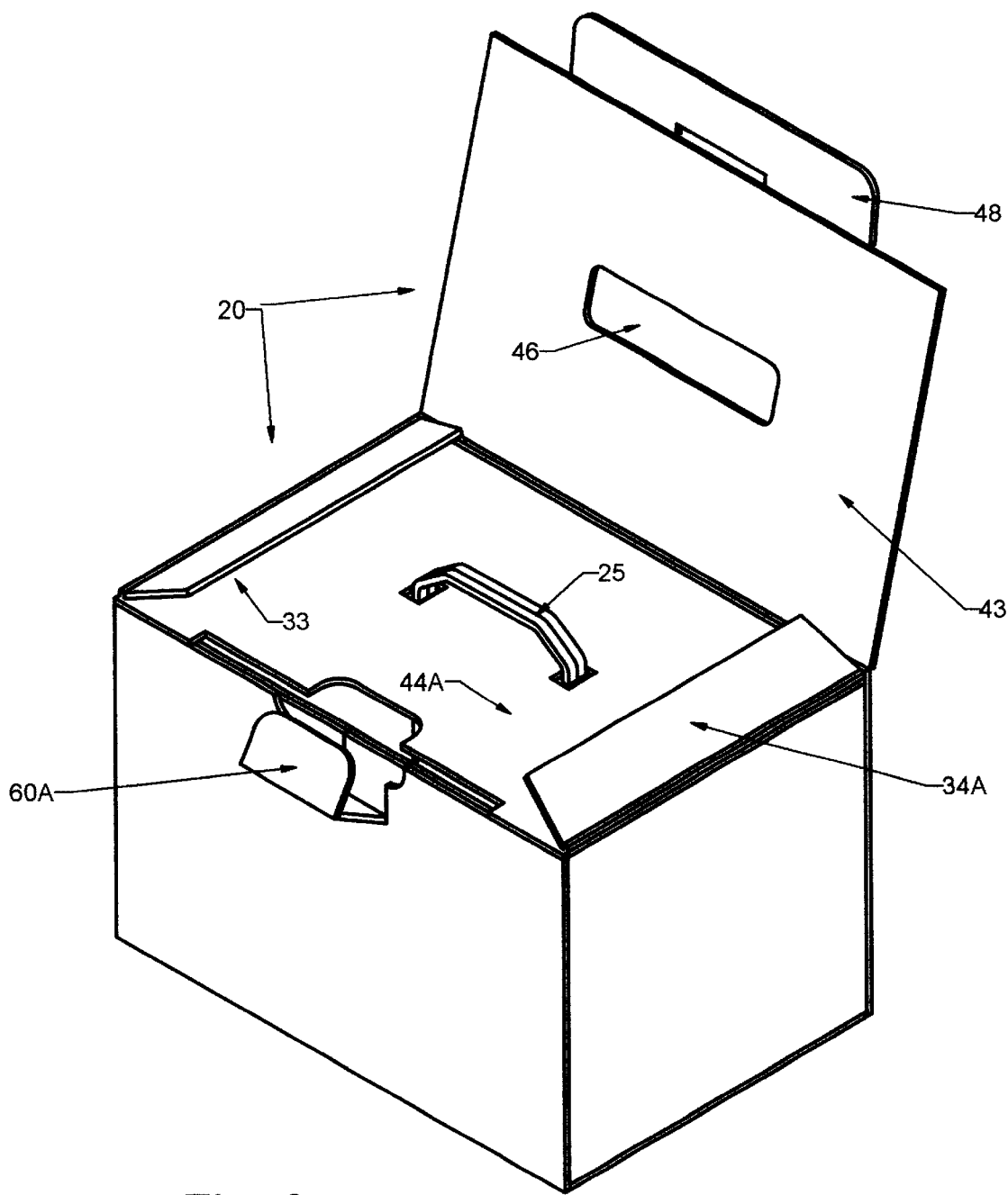
FIG. 6 is a perspective view similar to FIGS. 3–5, showing almost-completed folding of the blank of FIG. 2, with both side panels, both end panels, all corner panels, and one top panel almost completely folded, with the remaining top panel open.

FIG. 5 shows that, with the end panels and side panels displaced vertically, and with the corner panels thus folded as aforesaid and tucked inwardly, top panels 43 and 44 project generally horizontally away from the cooler. At this time the end panel flaps 33, 34 (i.e., 33A, and 34A) are vertically upright. With top panel 44/44A folded horizontally as in FIG. 6, handle 25 projects upwardly for thereafter clearing knock out hole 46. Flaps 33, 34A are pressed downwardly over top panel 44.

Figure 7:
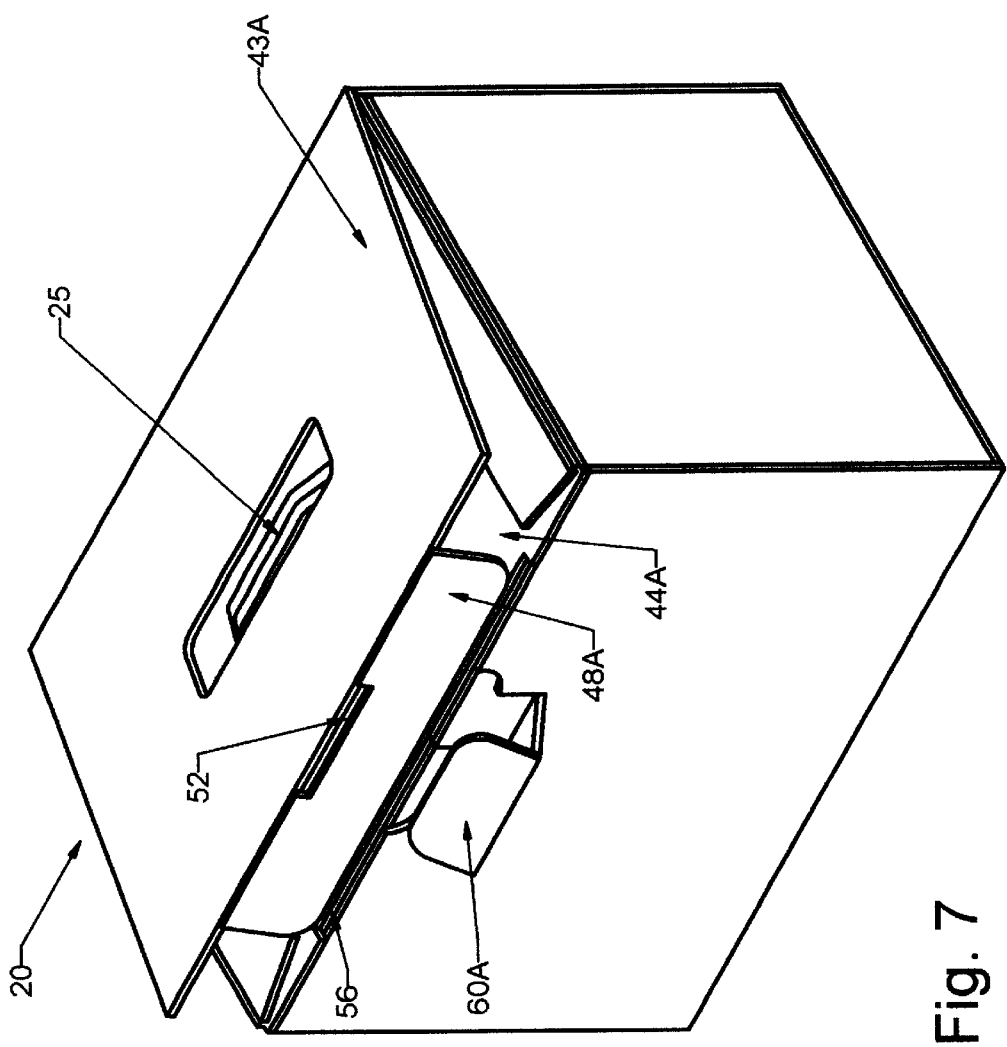
FIG. 7 is a perspective view similar to FIGS. 3–6, showing almost-completed folding of the blank of FIG. 2 (i.e., and assembly of the cooler), with the side panels, both end panels, all corner panels, and one top panel completely folded into place, with the remaining top panel about to be closed; and, FIG. 8 is a perspective view similar to FIGS. 3–7, showing the completed cooler with all panels folded together.
Figure 8:
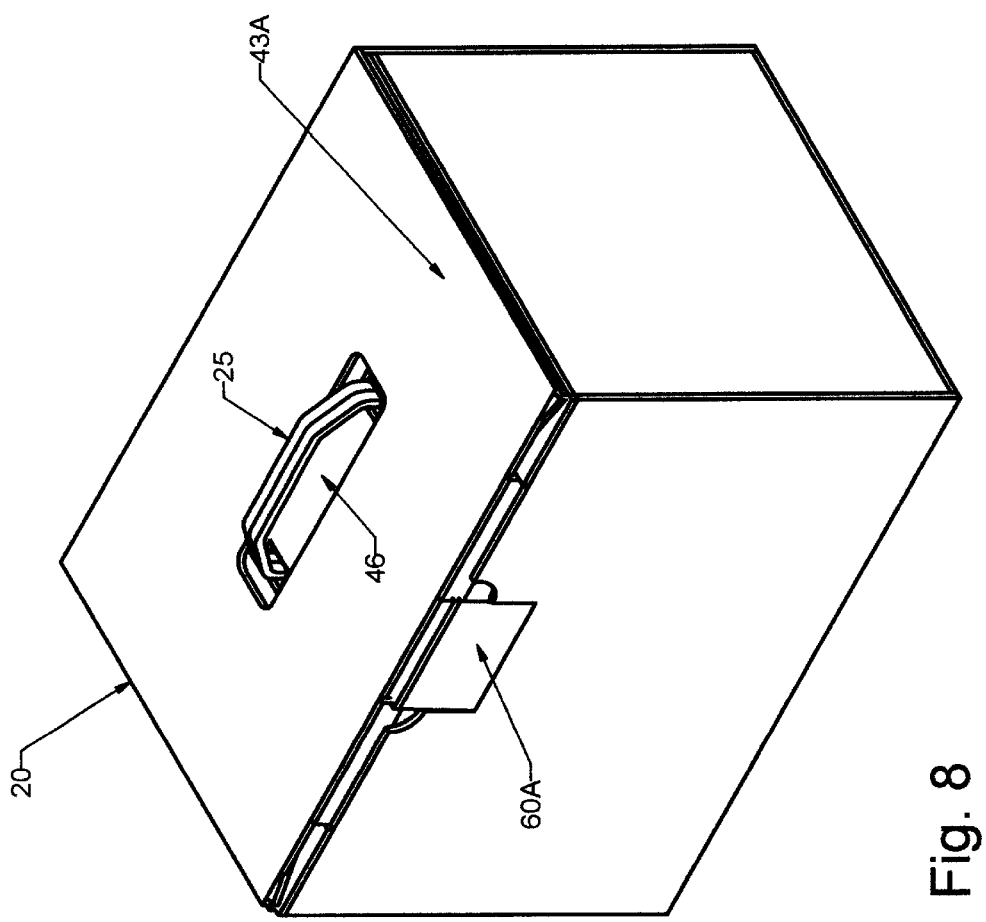

FIG. 7 shows that further folding brings top panel 43/43A down over the now-covered top panel 44A with locking flap 48/48A adapted to be forced within exposed anchor slot 56 (FIG. 7). Before top panel 43/43A is pressed downwardly to complete erection (FIG. 8) the flap 48/48A penetrates anchor slot 56, and immediately thereafter tab 60/60A is firmly thrust within tab receptive slot 52.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. A blank that is adapted to be folded to form a non-leaking box-like cooler for containing and transporting ice and containers of food or beverages, said blank comprising:

a generally rectangular center panel comprising a pair of spaced-apart ends;

a foldable end panel integrally disposed adjacent each center panel end;

a first integral, foldable side panel adjacent said center panel;

a first integral, foldable top panel adjacent said first side panel;

a second integral, foldable side panel adjacent said center panel;

a second, integral, foldable top panel adjacent said second side panel;

four, foldable diametrically spaced-apart corner panels, each corner panel integrally bordering a side panel and an end panel, and each corner panel comprising a diagonal score line;

said second top panel comprising an elongated anchor slot disposed between it and said second side panel, a foldable locking tab extending generally perpendicularly across said anchor slot, and anchor holes for securing a separate cooler handle;

said first top panel comprising a central hole for clearing said separate cooler handle upon assembly thus enabling the handle to be externally grasped by a consumer, an outermost foldable locking flap, and a tab-receptive slot defined between the locking flap and said first top panel;

a first pair of spaced apart, generally parallel score lines running the length of said blank and separating said center panel from said end panels and corner panels and enabling folding;

a second pair of spaced apart, generally parallel score lines generally perpendicular to and intersecting said first pair of score lines, said second pair of score lines running the width of said blank and separating said center panel from said side panels and corner panels;

knock-down score line arrays for facilitating the quick collapse of said cooler into a flattened configuration for convenient transport and storage; and, whereby, upon the folding together of said blank, said corner panels fold and interiorly project into the interior of the resulting cooler, said locking flap engages and penetrates said anchor slot, and the locking tab engages the tab receptive slot to lock the cooler together with said first top panel overlying said second top panel, with the handle anchored to the second top panel and extending through said first top panel exteriorly from the cooler.

2. A portable, user deployable leak-proof cooler for containing and transporting ice and containers comprising food and/or beverages, said cooler comprising:

a resilient handle for enabling the carrying of said cooler, the handle comprising a body adapted to be grasped by a user and a pair of integral, spaced-apart feet; and, a foldable blank comprising:

a generally rectangular center panel comprising a pair of spaced-apart ends;

a foldable end panel integrally disposed adjacent each center panel end;

a first integral, foldable side panel adjacent said center panel;

a first integral, foldable top panel adjacent said first side panel;

a second integral, foldable side panel adjacent said center panel;

a second, integral, foldable top panel adjacent said second side panel;

four, foldable diametrically spaced-apart corner panels, each corner panel integrally bordering a side panel and an end panel, and each corner panel comprising a diagonal score line;

said second top panel comprising an elongated anchor slot disposed between it and said second side panel, a foldable locking tab extending generally perpendicularly across said anchor slot, and anchor holes for securing a separate cooler handle;

said first top panel comprising a central hole for clearing said separate cooler handle upon assembly thus enabling the handle to be externally grasped by a consumer, an outermost foldable locking flap, and a tab-receptive slot defined between the locking flap and said first top panel;

a first pair of spaced apart, generally parallel score lines running the length of said blank and separating said center panel from said end panels and corner panels and enabling folding;

a second pair of spaced apart, generally parallel score lines generally perpendicular to and intersecting said first pair of score lines, said second pair of score lines running the width of said blank and separating said center panel from said side panels and corner panels;

knock-down score line arrays for facilitating the quick collapse of said cooler into a flattened configuration for convenient transport and storage; and, whereby, upon the folding together of said blank, said corner panels fold and interiorly project into the interior of the resulting cooler, said locking flap engages and penetrates said anchor slot, and the locking tab engages the tab receptive slot to lock the cooler together with said first top panel overlying said second top panel, with the handle feet anchored to the second top panel and with the handle body extending through said first top panel exteriorly from the cooler thereby enabling grasping by a user.

* * * * *